US012705790B2

(12) United States Patent
Baldan

(10) Patent No.: US 12,705,790 B2
(45) Date of Patent: Aug. 11, 2026

(54) ROLLING SHUTTER COMPENSATION

(71) Applicant: Motional AD LLC, Boston, MA (US)

(72) Inventor: Giancarlo Baldan, Somerville, MA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 19/121,019

(22) PCT Filed: Oct. 11, 2023

(86) PCT No.: PCT/US2023/034968

§ 371 (c)(1),
(2) Date: Apr. 14, 2025

(87) PCT Pub. No.: WO2024/081330

PCT Pub. Date: Apr. 18, 2024

(65) Prior Publication Data

US 2026/0120314 A1 Apr. 30, 2026

Related U.S. Application Data

(60) Provisional application No. 63/435,932, filed on Dec. 29, 2022, provisional application No. 63/416,474, filed on Oct. 14, 2022.

(51) Int. Cl.

*G06T 7/73* (2017.01)
*G06T 7/246* (2017.01)

(Continued)

(52) U.S. Cl.

CPC ................ *G06T 7/73* (2017.01); *G06T 7/246* (2017.01); *G06V 20/58* (2022.01); *H04N 23/71* (2023.01);

(Continued)

(58) Field of Classification Search

CPC . G06T 7/73; G06T 7/246; G06T 2207/30252; G06V 20/58; H04N 23/71;

(Continued)

(56) References Cited

U.S. PATENT DOCUMENTS 8,786,716 B2 * 7/2014 Zhou .................. H04N 23/6812 348/208.4
9,124,807 B2 * 9/2015 Tsubaki ............... H04N 23/689

(Continued)

FOREIGN PATENT DOCUMENTS

WO WO 2021/113147 A1 6/2021

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

(Continued)

*Primary Examiner* — Brian P Yenke
(74) *Attorney, Agent, or Firm* — Fish & Richardson P.C.

(57) ABSTRACT

Provided are methods for rolling shutter compensation, which can include causing a rolling shutter camera to capture an image of an environment; determining a first position in the environment, the first position captured in the image; and determining, by the at least one processor, a second position in the image that corresponds to the first position in the environment. Determining the second position includes applying a first approximation that relative movement between the rolling shutter camera and the first position is linear during the capture of the image, applying a second approximation that a distortion function characterizing the rolling shutter camera is linear, and based at least on the first approximation and the second approximation, determining a particular time at which light representative of (Continued)

600
608
610
Image Scanning
m(t)
602
604
612
q(t*)
606
q(t₀)
q(t)

900

Cause a rolling shutter camera to capture an image of an environment
902

Determine a first position in the environment
904

Apply a first approximation that relative movement between the rolling shutter camera and the first position is linear during the capture of the image
906

Apply a second approximation that a distortion function characterizing the rolling shutter camera is linear.
908

Based at least on the first approximation and the second approximation, determine a particular time at which light representative of the first position in the environment is detected by the rolling shutter camera.
910

Determine, based at least on the particular time, a second position in the image that corresponds to the first position in the environment.
912 the first position in the environment is detected by the rolling shutter camera. Systems and computer program products are also provided.

21 Claims, 13 Drawing Sheets

(51) Int. Cl.
*G06V 20/58* (2022.01)
*H04N 23/71* (2023.01)
*H04N 23/73* (2023.01)
*B60W 60/00* (2020.01)

(52) U.S. Cl.
CPC .......... *H04N 23/73* (2023.01); *B60W 60/001* (2020.02); *B60W 2420/403* (2013.01); *G06T 2207/30252* (2013.01)

(58) Field of Classification Search
CPC ........... H04N 23/73; B60W 2420/403; B60W 60/001
See application file for complete search history.

(56) References Cited

U.S. PATENT DOCUMENTS 9,602,725 B2 * 3/2017 Mantzel ................ H04N 23/68
10,012,504 B2 * 7/2018 Roumeliotis ...... G01C 21/1656
10,440,271 B2 10/2019 Ramlingam et al.
10,498,966 B2 * 12/2019 Wheeler ................ G01S 7/497
10,834,324 B2 * 11/2020 Berberian ............. H04N 23/68
10,911,680 B2 * 2/2021 Kerr ..................... G06T 7/0002
11,295,477 B1 * 4/2022 Wang ........................ G06T 7/80
11,405,557 B1 * 8/2022 Li ......................... B25J 19/023
11,451,688 B2 * 9/2022 Benemann ......... H04N 23/6812
11,636,623 B2 * 4/2023 Muhassin ............ H04N 17/002 348/222.1
12,287,405 B1 * 4/2025 Purdy ..................... G01S 17/86
2007/0154202 A1 * 7/2007 Lee ...................... H04N 23/689 348/E5.037
2014/0232887 A1 * 8/2014 Berberian .......... H04N 23/6811 348/208.6
2016/0292882 A1 * 10/2016 Comport ................. G06T 7/248
2017/0180654 A1 * 6/2017 Swaminathan .......... G01C 3/08
2017/0187961 A1 * 6/2017 Katz .................. H04N 23/6812
2018/0192035 A1 * 7/2018 Dabeer ..................... G06T 5/50
2018/0308240 A1 * 10/2018 Comport ................... G06T 7/70
2019/0068884 A1 * 2/2019 Purkait ................... G06T 7/251
2019/0158716 A1 * 5/2019 Kerr .......................... G06T 5/80
2020/0099824 A1 3/2020 Benemann et al.
2021/0024096 A1 * 1/2021 Wang .................. G06V 20/588
2022/0103734 A1 * 3/2022 Halmetschlager-Funek ................ H04N 23/6811
2024/0196084 A1 * 6/2024 Vasconcelos ........ H04N 13/167
2025/0022175 A1 * 1/2025 Wu ...................... H04N 13/239
2025/0078312 A1 * 3/2025 Devitt ....................... G06T 7/55

OTHER PUBLICATIONS

Do et al., "Visible light communication based vehicle positioning using a rolling shutter CMOS sensor," 2016 Eighth International Conference on Ubiquitous and Future Networks (ICUFN), IEEE, Jul. 5, 2016, pp. 48-50.
International Search Report and Written Opinion in International Appln. No. PCT/US2023/034968, mailed on Mar. 11, 2024, 14 pages.
waymo.com [online], "Waymo Open Dataset," 2019, retrieved on Apr. 10, 2025, retrieved from URL<https://waymo.com/open/>.
International Preliminary Report on Patentability in International Appln. No. PCT/US2023/034968, mailed on Apr. 15, 2025, 7 pages.

* cited by examiner

ROLLING SHUTTER COMPENSATION

CROSS-REFERENCE TO RELATED APPLICATIONS

This application claims priority to U.S. Provisional Patent Application No. 63/416,474, filed Oct. 14, 2022 and U.S. Provisional Patent Application No. 63/435,932, filed Dec. 29, 2022, both entitled "ROLLING SHUTTER COMPENSATION," the entirety of which are incorporated by reference herein.

BACKGROUND

Autonomous or semi-autonomous vehicles navigate through environments based on sensor and other data. The sensors can include cameras, such as rolling shutter cameras.

DETAILED DESCRIPTION

Figure 1:
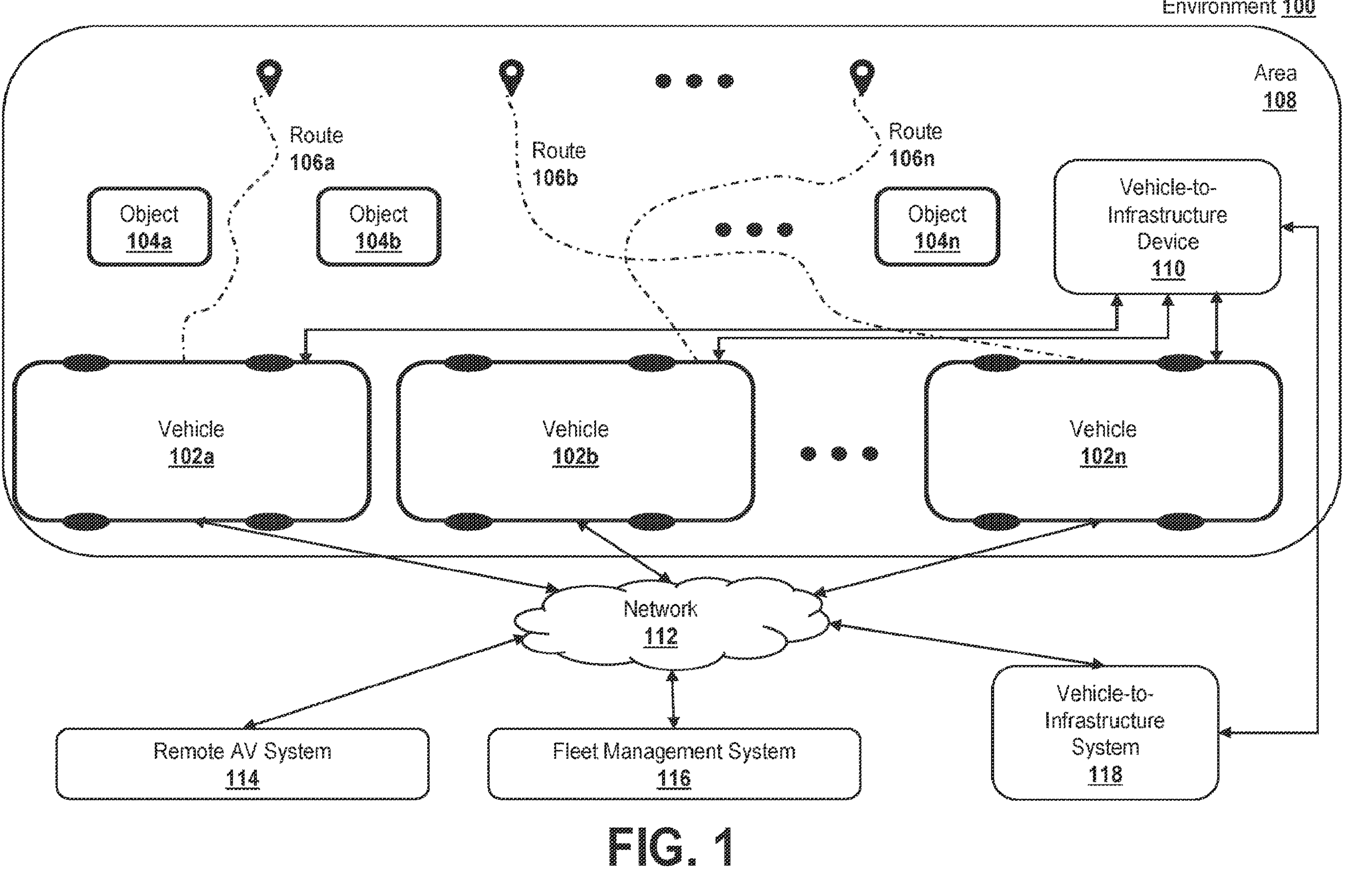
FIG. 1 is an example environment in which a fleet management system and a vehicle including one or more components of an autonomous system can be implemented.

In the following description, numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement techniques to perform rolling shutter compensation for images captured using a rolling shutter camera, e.g., to determine correspondences between real-world positions and positions in captured images.

By virtue of the implementation of the systems, methods, and computer program products described herein, in some embodiments, correspondences between real-world positions and image positions can be determined more quickly than by some other methods, such as some iterative methods that account for relative motion between camera and environment. In some embodiments, the determination can be performed with a high degree of accuracy and with relatively low additional latency compared to less-accurate methods that do not account for relative motion between camera and environment. Moreover, in some embodiments, determination of the correspondences can be performed in parallel, e.g., without requiring branching processes. As described in greater detail in the following sections, the disclosed systems, methods, and computer program products can be implemented for operation of vehicles, including autonomous, semi-autonomous, or non-autonomous vehicle. Using the disclosed techniques, environments of an autonomous, semi-autonomous, or non-autonomous vehicle can be imaged and analyzed rapidly and accurately.

Referring now to FIG. 1, illustrated is an example environment in which a fleet management system and a vehicle including one or more components of an autonomous system can be implemented. As illustrated, environment 100 includes vehicles 102*a*-102*n*, objects 104*a*-104*n*, routes 106*a*-106*n*, area 108, vehicle-to-infrastructure (V2I) device 110, network 112, remote autonomous vehicle (AV) system 114, fleet management system 116, and V2I system 118. Vehicles 102*a*-102*n*, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104*a*-104*n* interconnect with at least one of vehicles 102*a*-102*n*, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102*a*-102*n* (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106*a*-106*n* (referred to individually as route 106 and collectively as routes 106), as described herein. In some embodiments, one or more vehicles 102 include an autonomous system (e.g., an autonomous system that is the same as or similar to autonomous system 202).

Objects 104*a*-104*n* (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106*a*-106*n* (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like). The fleet management system 116 can provide route data to the vehicles 102 to cause the vehicles 102 to navigate based on the route data.

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
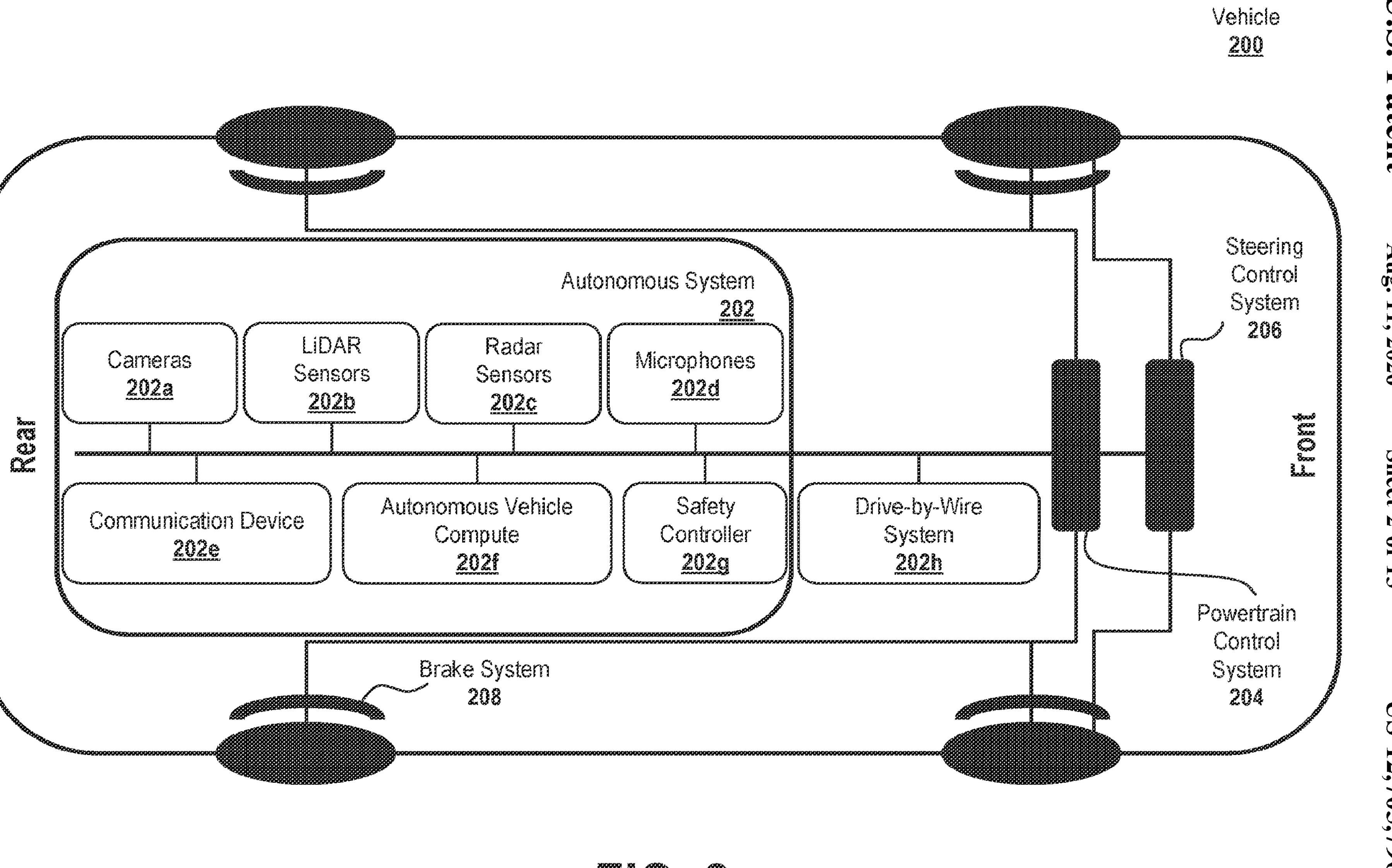
FIG. 2 is a diagram of one or more systems of a vehicle including an autonomous system.

Referring now to FIG. 2, vehicle 200 (which may be the same as, or similar to vehicle 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 with autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202*a*, LiDAR sensors 202*b*, radar sensors 202*c*, and microphones 202*d*. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202*e*, autonomous vehicle compute 202*f*, drive-by-wire (DBW) system 202*h*, and safety controller 202*g*.

Figure 3:
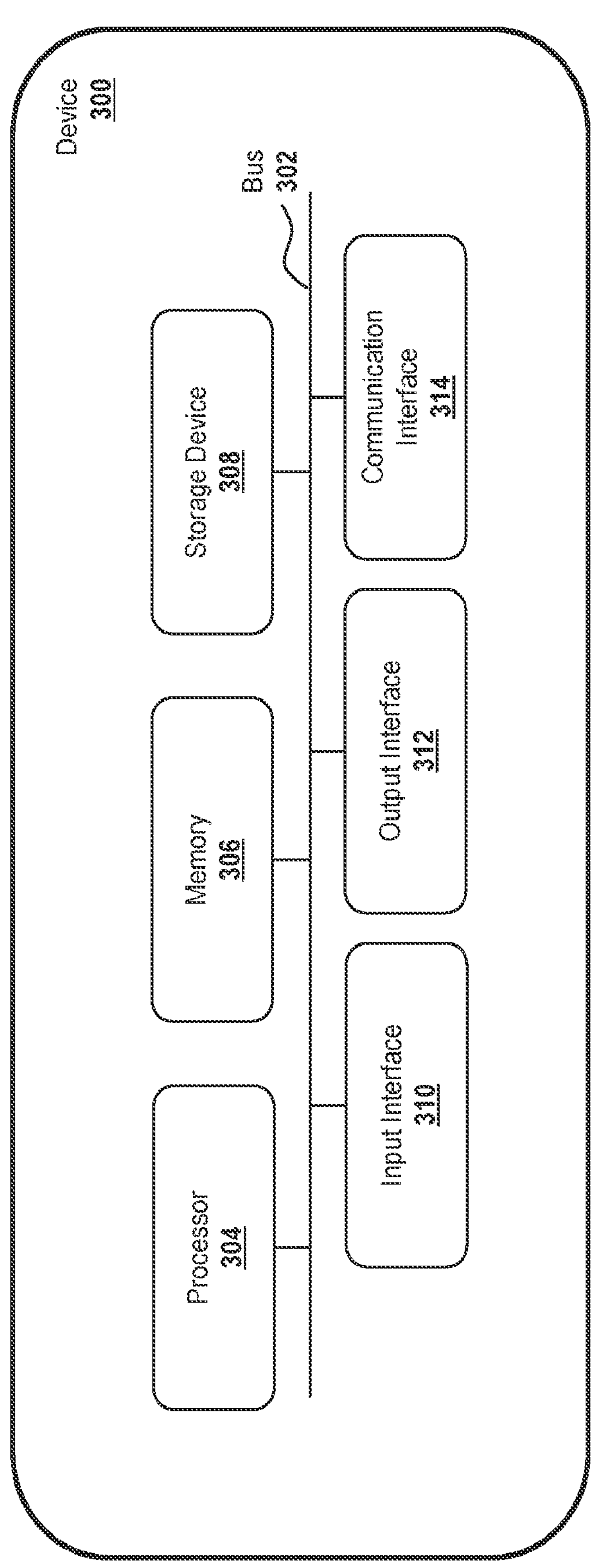
FIG. 3 is a diagram of components of one or more devices and/or one or more systems of FIGS. 1 and 2.

Cameras 202*a* include at least one device configured to be in communication with communication device 202*e*, autonomous vehicle compute 202*f*, and/or safety controller 202*g* via a bus (e.g., a bus that is the same as or similar to bus 302 of FIG. 3). Cameras 202*a* include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202*a* generates camera data as output. In some examples, camera 202*a* generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202*a* includes a plurality of independent cameras configured on (e.g., positioned on) a vehicle to capture images for the purpose of stereopsis (stereo vision). In some examples, camera 202*a* includes a plurality of cameras that generate image data and transmit the image data to autonomous vehicle compute 202*f* and/or a fleet management system (e.g., a fleet management system that is the same as or similar to fleet management system 116 of FIG. 1). In such an example, autonomous vehicle compute 202*f* determines depth to one or more objects in a field of view of at least two cameras of the plurality of cameras based on the image data from the at least two cameras. In some embodiments, cameras 202*a* is configured to capture images of objects within a distance from cameras 202*a* (e.g., up to 100 meters, up to a kilometer, and/or the like). Accordingly, cameras 202*a* include features such as sensors and lenses that are optimized for perceiving objects that are at one or more distances from cameras 202*a*.

In an embodiment, camera 202*a* includes at least one camera configured to capture one or more images associated with one or more traffic lights, street signs and/or other physical objects that provide visual navigation information. In some embodiments, camera 202*a* generates traffic light data associated with one or more images. In some examples, camera 202*a* generates TLD (Traffic Light Detection) data associated with one or more images that include a format (e.g., RAW, JPEG, PNG, and/or the like). In some embodiments, camera 202*a* that generates TLD data differs from other systems described herein incorporating cameras in that camera 202*a* can include one or more cameras with a wide field of view (e.g., a wide-angle lens, a fish-eye lens, a lens having a viewing angle of approximately 120 degrees or more, and/or the like) to generate images about as many physical objects as possible.

In some embodiments, camera 202*a* includes at least one rolling shutter camera, which may be any of the camera types described above in reference to cameras 202*a*. The operation of rolling shutter cameras is described in more detail below in reference to FIG. 7.

Light Detection and Ranging (LiDAR) sensors 202*b* include at least one device configured to be in communication with communication device 202*e*, autonomous vehicle compute 202*f*, and/or safety controller 202*g* via a bus (e.g., a bus that is the same as or similar to bus 302 of FIG. 3). LiDAR sensors 202*b* include a system configured to transmit light from a light emitter (e.g., a laser transmitter). Light emitted by LiDAR sensors 202*b* include light (e.g., infrared light and/or the like) that is outside of the visible spectrum. In some embodiments, during operation, light emitted by LiDAR sensors 202*b* encounters a physical object (e.g., a vehicle) and is reflected back to LiDAR sensors 202*b*. In some embodiments, the light emitted by LiDAR sensors 202*b* does not penetrate the physical objects that the light encounters. LiDAR sensors 202*b* also include at least one light detector which detects the light that was emitted from the light emitter after the light encounters a physical object. In some embodiments, at least one data processing system associated with LIDAR sensors 202*b* generates an image (e.g., a point cloud, a combined point cloud, and/or the like) representing the objects included in a field of view of LiDAR sensors 202*b*. In some examples, the at least one data processing system associated with LiDAR sensor 202*b* generates an image that represents the boundaries of a physical object, the surfaces (e.g., the topology of the surfaces) of the physical object, and/or the like. In such an example, the image is used to determine the boundaries of physical objects in the field of view of LiDAR sensors 202*b*.

Radio Detection and Ranging (radar) sensors 202*c* include at least one device configured to be in communication with communication device 202*e*, autonomous vehicle compute 202*f*, and/or safety controller 202*g* via a bus (e.g., a bus that is the same as or similar to bus 302 of FIG. 3). Radar sensors 202*c* include a system configured to transmit radio waves (either pulsed or continuously). The radio waves transmitted by radar sensors 202*c* include radio waves that are within a predetermined spectrum. In some embodiments, during operation, radio waves transmitted by radar sensors 202*c* encounter a physical object and are reflected back to radar sensors 202*c*. In some embodiments, the radio waves transmitted by radar sensors 202*c* are not reflected by some objects. In some embodiments, at least one data processing system associated with radar sensors 202*c* generates signals representing the objects included in a field of view of radar sensors 202*c*. For example, the at least one data processing system associated with radar sensor 202*c* generates an image that represents the boundaries of a physical object, the surfaces (e.g., the topology of the surfaces) of the physical object, and/or the like. In some examples, the image is used to determine the boundaries of physical objects in the field of view of radar sensors 202*c*.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* includes at least one device configured to be in communication with cameras 202*a*, LiDAR sensors 202*b*, radar sensors 202*c*, microphones 202*d*, autonomous vehicle compute 202*f*, safety controller 202*g*, and/or DBW (Drive-By-Wire) system 202*h*. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LIDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300, e.g., components of one or more devices and/or one or more systems of FIGS. 1 and 2. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of remote AV system 114, at least one device of fleet management system 116, at least one device of vehicle-to-infrastructure system 118, and/or one or more devices of network 112 (e.g., one or more devices of a system of network 112). In some embodiments, one or more devices of vehicles 102 (e.g., one or more devices of a system of vehicles 102), one or more devices of remote AV system 114, one or more devices of fleet management system 116, one or more devices of vehicle-to-infrastructure system 118, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
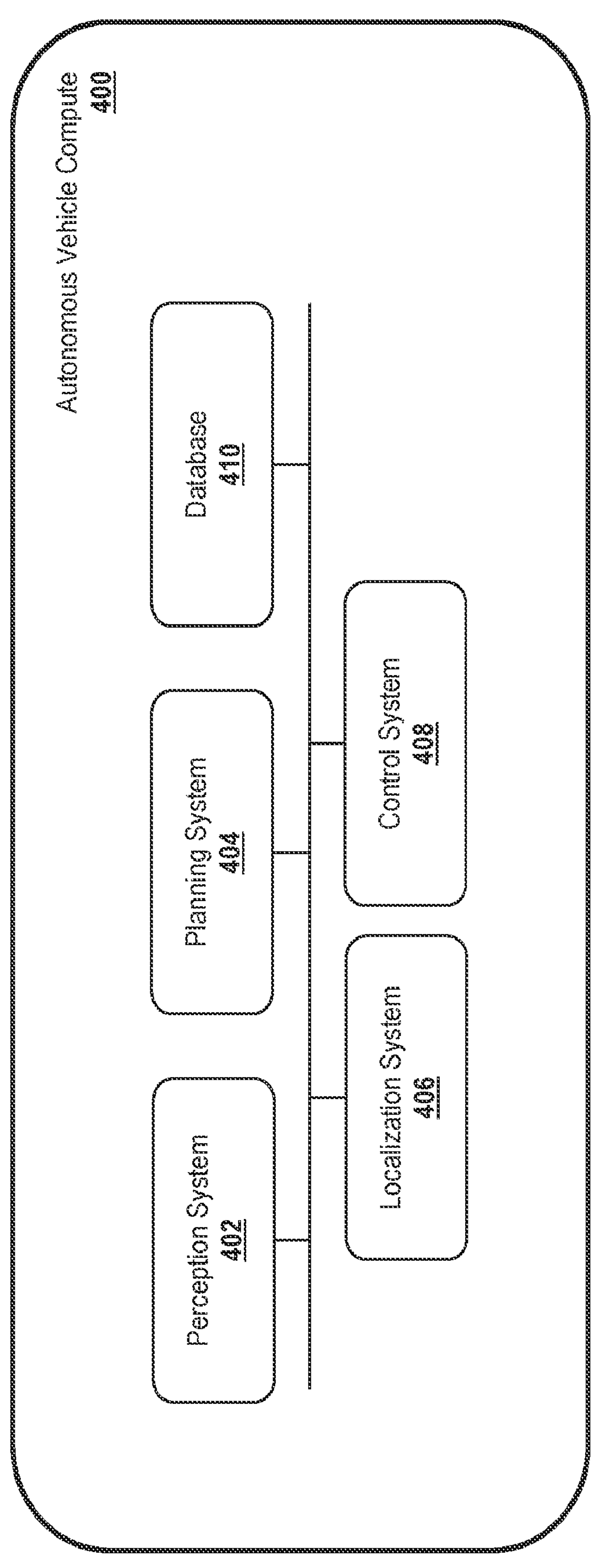
FIG. 4 is a diagram of certain components of an autonomous system including an autonomous vehicle compute.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute **202*f* of vehicle 200). Additionally, or alternatively, in some embodiments, perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118**, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LIDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Rolling Shutter Compensation

Figure 5B:
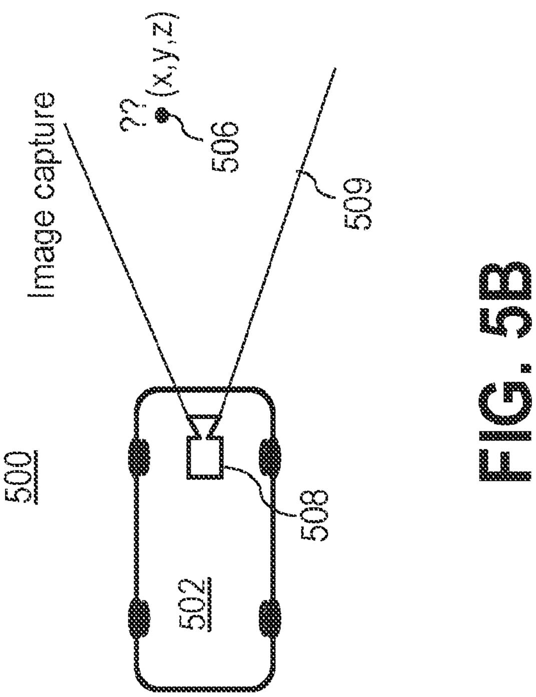
FIGS. 5A-5B are diagrams illustrating position detection and image capture.
Figure 5A:
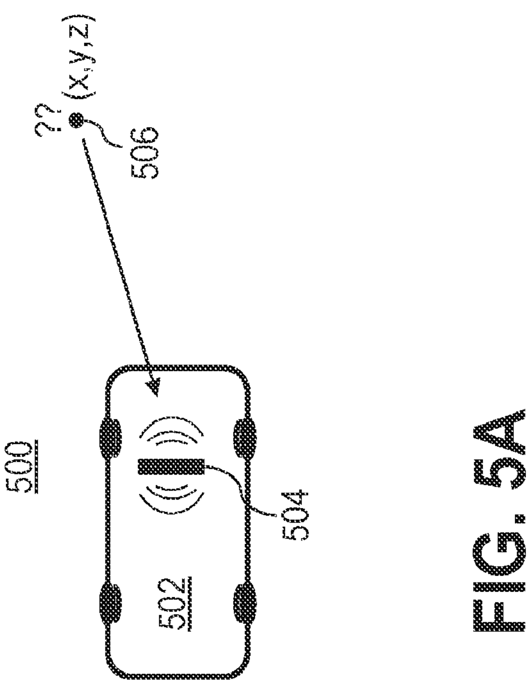
Figure 5C:
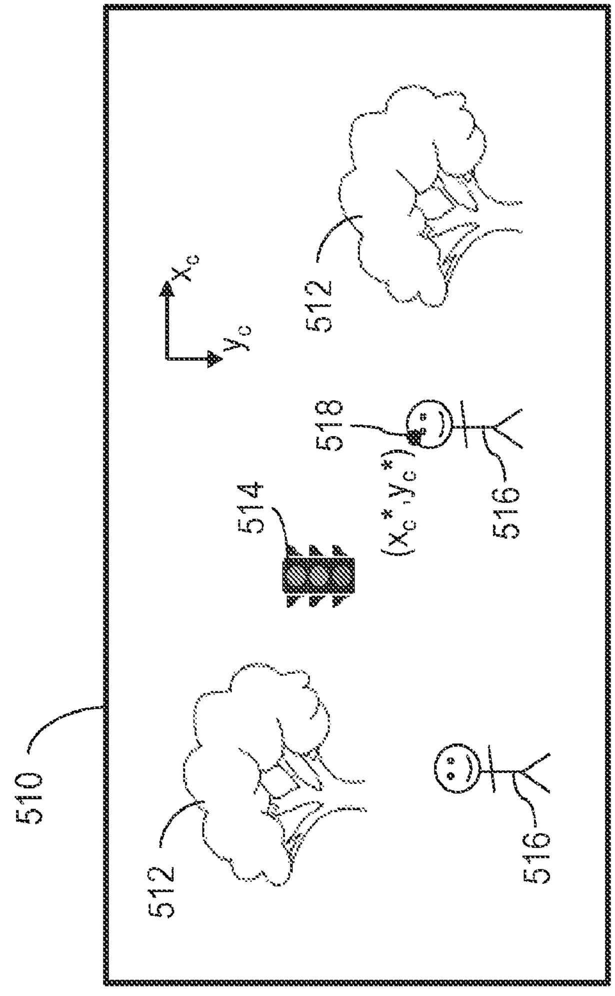
FIG. 5C is a diagram illustrating an example of a captured image.

To accurately assess its environment, a vehicle or a sub-system thereof (such as vehicle 102 and/or vehicle 200, and/or perception system 402 and/or another element of autonomous vehicle compute 400) may correlate positions in its environment with positions in one or more images captured by a camera of the vehicle, such as cameras 202*a*. An example of such a process is illustrated in FIGS. 5A-5C. As shown in FIG. 5A, in an environment 500, a sensor 504 (such as LiDAR sensor 202*b* or radar sensor 202*c*), mounted in/on a vehicle 502 (such as vehicles 102 and/or vehicle 200) detects an object 506 at position (x, y, z). Based on the sensor data from the sensor 504, an associated computing system (such as perception system 402) can identify the presence, position, and, in some cases, general structural information about the object 506 (e.g., overall dimensions/shape of the object 506), but cannot identify specifically a type of the object 506. For example, based on LiDAR sensor data alone, the perception system 402 may struggle to differentiate between a child and a small tree.

To allow for more accurate identification of the object 506, as shown in FIG. 5B, one or more cameras 508 (e.g., cameras 202*a*) mounted in/on the vehicle 502 can capture an image of a portion of the environment 500 that includes the object 506 (e.g., a portion defined by a field of view 509 of the camera 508). As shown in FIG. 5C, the captured image 510 includes various features in the environment 500, such as trees 512, people 516, and a traffic light 514. These features are arranged in an image coordinate system ($x_c$, $y_c$), e.g., a two-dimensional image coordinate system. To correlate the object 506 with its feature in the environment, the computing system determines a position ($x_c$*, $y_c$*) 518 in the image 510 (sometimes referred to as a "second" position) that corresponds to the real-world position (x, y, z) of the object 506 (sometimes referred to as a "first" position). In this example, the position 518 in the image 510 is located on a person 516. Based on this determination of the correspondence between the position of the object 506 and the position 518 in the image 510, the computing system can apply one or more image analysis processes, e.g., an object recognition process, to identify that the object 506 is a person, based on which navigation of the vehicle 502 can be caused/controlled, e.g., as described in more detail below in reference to FIG. 12.

Figure 6:
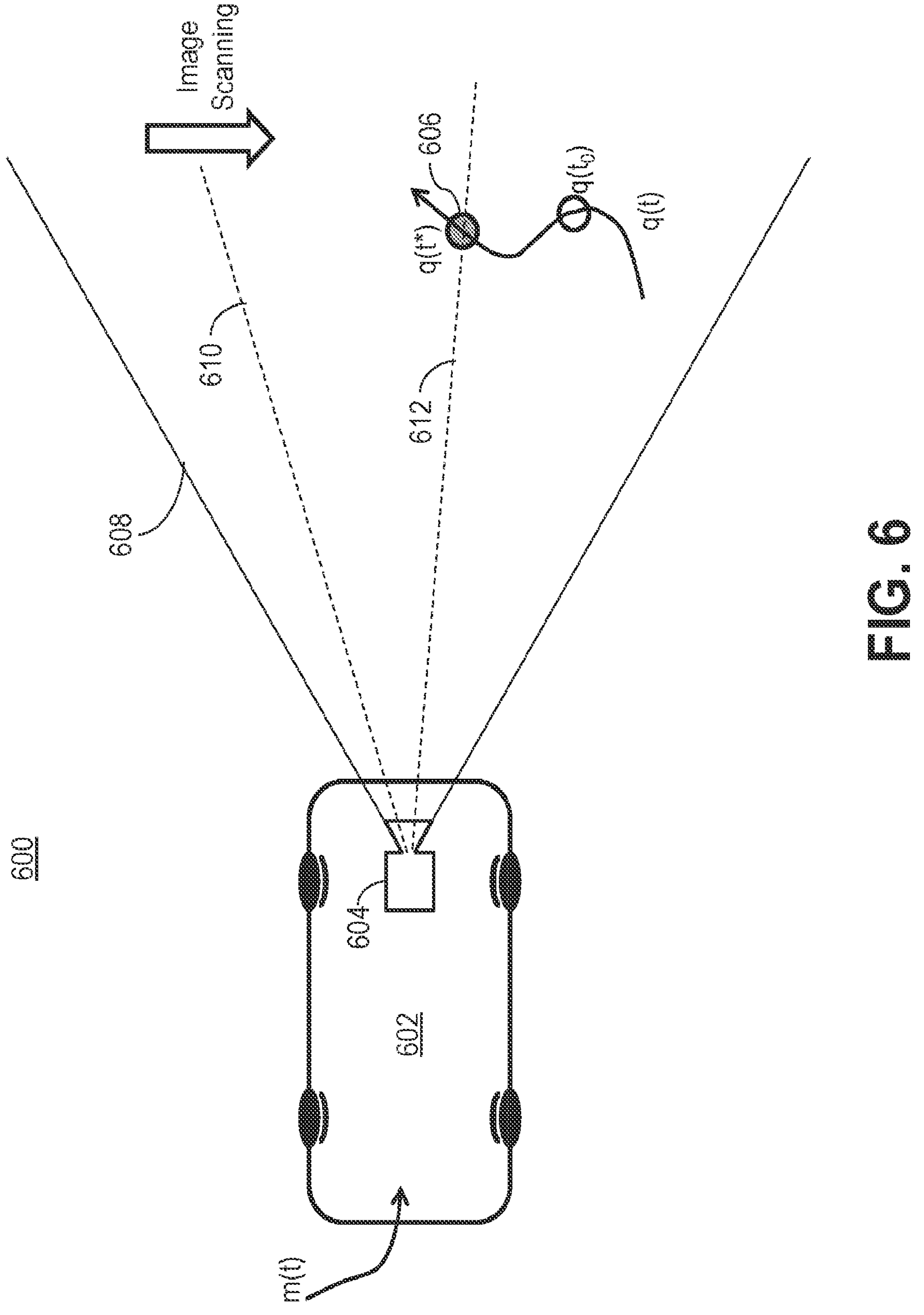
FIG. 6 is a diagram illustrating image capture with a rolling shutter camera.

However, in practice, determining the position 518 that corresponds to the position of the object 506 can be computationally intensive. This may be particularly the case when the camera 508 is a rolling shutter camera. As shown in FIG. 6, a vehicle 602 (e.g., vehicles 102, 200, and/or 502) includes a rolling shutter camera 604, e.g., having one or more of the characteristics described for cameras 202*a*. The rolling shutter camera 604 captures an image of an object 606 in the environment 600. However, in a rolling shutter camera, the image is not captured at a single time but, rather, over a series of multiple times dictated by the action of the rolling shutter of the rolling shutter camera.

Figure 7:
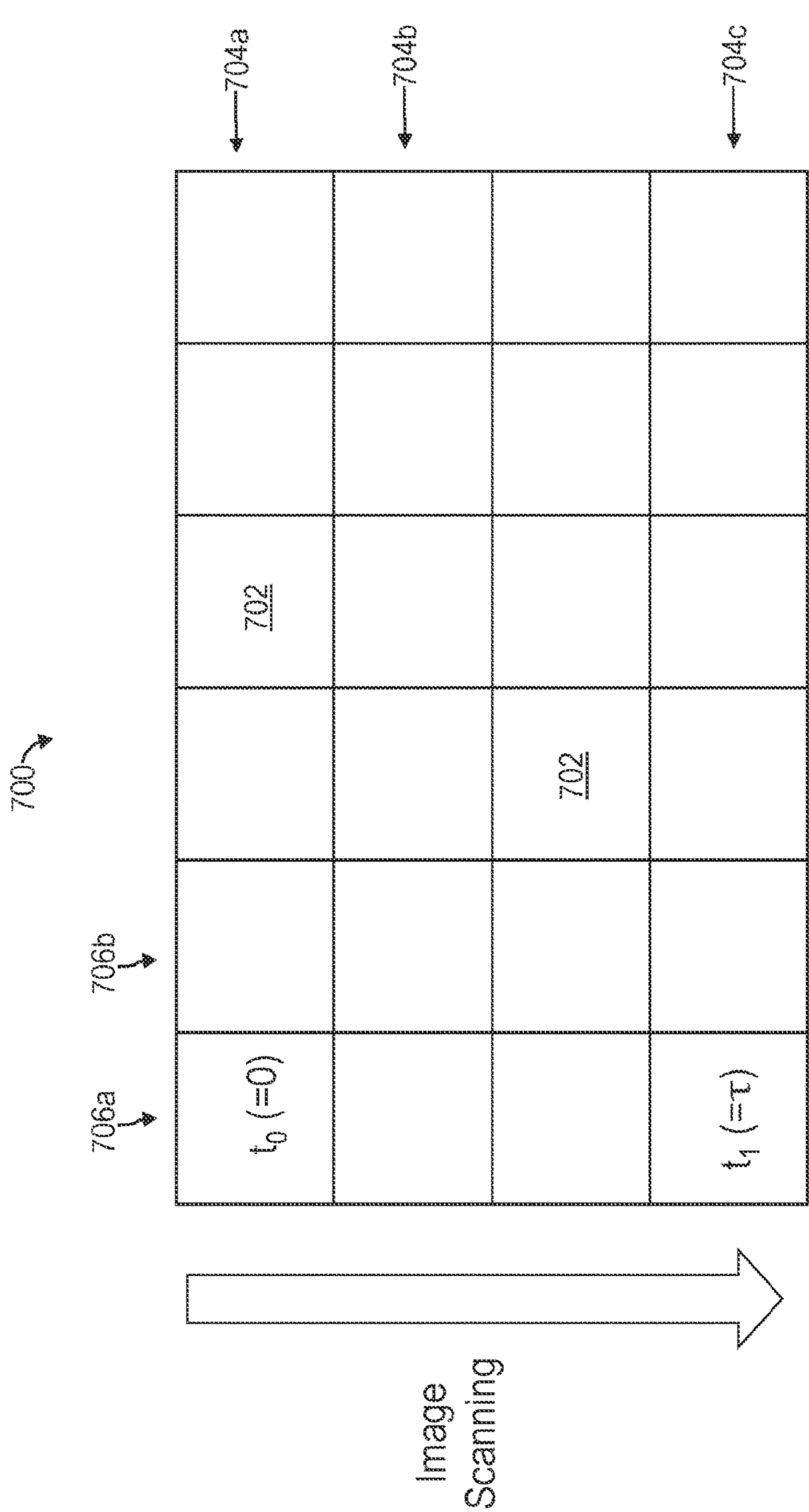
FIG. 7 is a diagram illustrating an image sensor of a rolling shutter camera.

As shown in FIG. 7, an example of a sensor 700 of a rolling shutter camera (e.g., rolling shutter camera 604) includes a series of pixels (e.g., pixels 702) arranged in rows (e.g., rows 704*a*, 704*b*) and columns (e.g., columns 706*a*, 706*b*). The pixels 702 can be, for example, defined by individual electronic devices, such as metal-oxide-semiconductor (MOS) sensors or sets of individual sensors, e.g., three individual sensors (such as red, green, and blue) for each pixel 702. The pixels 702 are controlled in a row-wise or column-wise configuration to sequentially detect light, and the detected light from all pixels 702 of the sensor 700 forms a resulting image. The sensor 700 is a simple example including 24 pixels 702; sensors according to this disclosure may have many more pixels, e.g., millions of pixels distributed over thousands of rows/columns.

For example, at a first time to (sometimes set to t=0 in descriptions herein), pixels of the first row 704*a* are caused to detect light. For example, in an electronic rolling shutter camera, voltages and/or currents are provided to the pixels 702 of the first row 704*a* to cause the pixels 702 to detect light. Light detection by each pixel of the first row 704*a* can be substantially simultaneous. An intensity of light detected by each sensor of the pixels 702 of the first row 704*a* (and, in some implementations, wavelength information of the detected light) is stored, e.g., in a memory or other storage coupled to the sensor 700, where the memory or other storage may be included in the rolling shutter camera or distinct from the rolling shutter camera. At a second time after the first time, pixels 702 of a second row 704*b* (e.g., adjacent to the first row 704*a*) are caused to detect light, and detected light intensities from the pixels 702 of the second row 704*b* are stored. The process can continue in a row-wise manner until, at a time $t_1$ (sometimes referred to as $\tau$ in descriptions herein), pixels 702 of a last row 704*c* are triggered to sense light. Accordingly, the resulting image represents image capture not at a single time but over a series of times associated with light-sensing by different rows.

Other configurations besides this row-wise top-down configuration are within the scope of this disclosure. For example, in some embodiments, the pixels 702 are caused to sense light in a column-wise manner, e.g., first column 706*a*, then column 706*b*, etc. As another example, other sensing patterns are also within the scope of this disclosure, e.g., sensing patterns that start with a center row/column and move outwards from the center.

Moreover, in various embodiments, the rolling shutter can be an electronic rolling shutter (e.g., associated with voltages/currents provided to sensor circuits to cause light sensing) or a mechanical rolling shutter, e.g., using a physical moving shutter that passes over the pixels 702. In addition, even so-called "global shutter" cameras are associated with a finite pixel exposure time that means that images are not captured at a single instantaneous point in time; some embodiments of the processes described herein can be applied to such cameras.

In some embodiments, the pixels 702 correspond to positions in captured images. For example, the intensity/color of light detected at each pixel 702 results in a corresponding colored pixel in the image at a certain position that corresponds to the position of the pixel 702 in the sensor 700. For example, the top-left pixel 702 can capture light represented by the top-left pixel in a captured image. Accordingly, based on this correspondence, in some implementations, the image coordinate system $(x_c, y_c)$ is, or can be mapped to, a pixel coordinate system, and determination of a position in an image can be equivalent to determination of a pixel 702 in the image sensor 700 that captures light for the position in the image.

Referring again to FIG. 6, because camera 604 is a rolling shutter camera, image capture within the field of view 608 is not simultaneous. Rather, image scanning proceeds across the field of view 608, such that, for example, the rolling shutter camera 604 detects light from along a first line 610 at a first time and detects light from along a second line 612 at a second time, where the second time is after the first time.

This rolling shutter operation can cause an object 606 to appear at a position in the captured image that depends on movement of one or both of the vehicle 602 and the object 606, because the object 606 is captured at the intersection time of (i) scanning across portions of the environment 600 captured by the rolling shutter camera 604 (e.g., along lines 610 or 612) and (ii) the position of the object 606, which can change over time. As shown in FIG. 6, the object 606 moves along a trajectory q(t), and the vehicle 602 moves along a trajectory m(t). Accordingly, to determine the position $(x_c^*, y_c^*)$ in a captured image that corresponds to a position of the object 606, the q(t*) or an approximation thereof can be determined, where t* is the time at which light representative of the object 606 is sensed by the rolling shutter camera 604 (as opposed to, e.g., a less specific "image capture time" that does not account for the rolling shutter.

The vehicle trajectory m(t) is known with a high degree of precision by the vehicle 602 (e.g., based on processing by the localization system 406), such that the trajectory q(t) of the object 606 can be determined by the vehicle in reference to the vehicle 602 or a portion thereof. For example, the coordinates x(t), y(t), z(t) of the vehicle trajectory q(t) can be normalized with respect to a moving coordinate (0, 0, 0) of the rolling shutter camera 604, e.g., based on movement of the vehicle (in which the rolling shutter camera is mounted) during capture of the image. As used herein, q(t) refers to real-world coordinates in a relative coordinate system that moves with the rolling shutter camera 604. In some embodiments, q(t) is determined based on sensor data (e.g., LiDAR sensor data and/or radar sensor data) indicative of positions of an object (e.g., movement of the object), where the first position is a position of the object.

Figure 8:
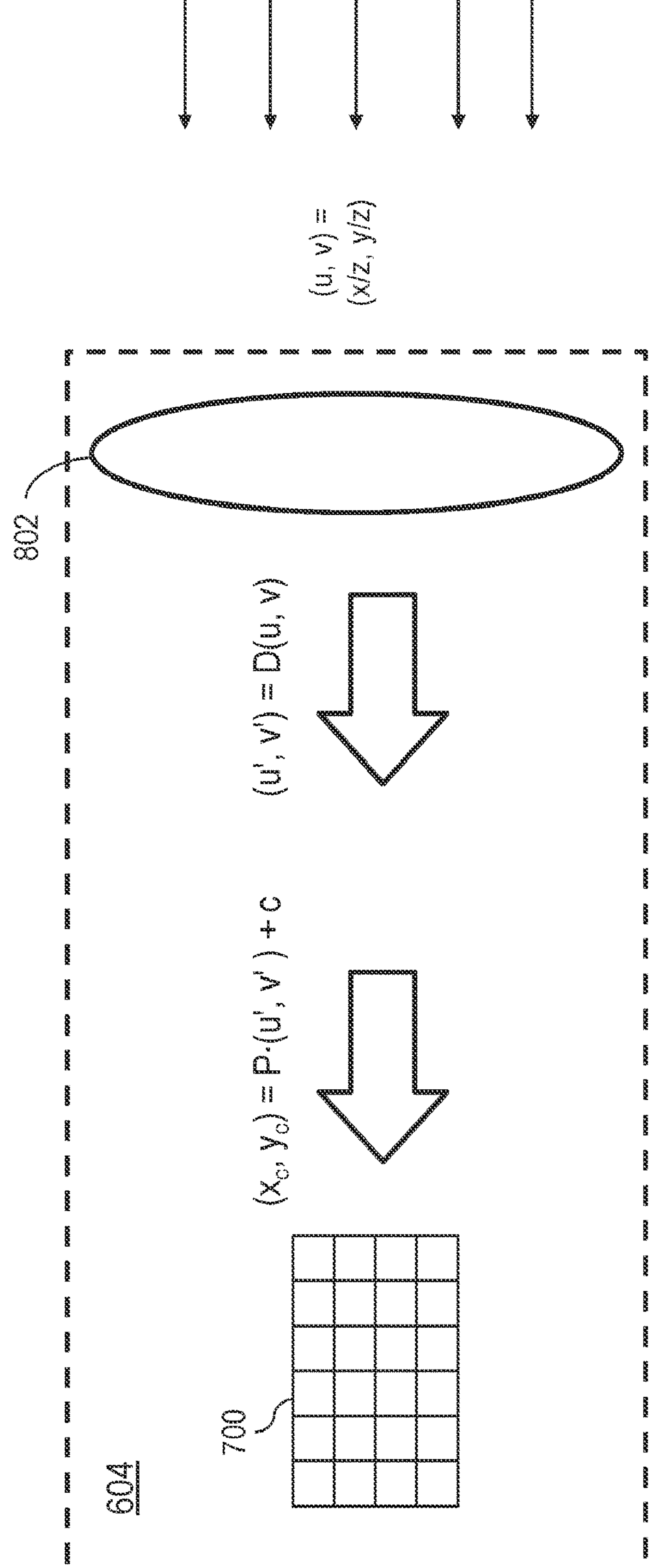
FIG. 8 is a diagram illustrating optical functions associated with image capture.

Other features of the rolling shutter camera 604 may instead or additionally be considered when determining the $(x_c^*, y_c^*)$ that correspond to a given position in the environment. For example, as shown in FIG. 8, the rolling shutter camera 604 may include one or more optical components 802, such as lens(es), collimator(s), filter(s), reflector(s), polarizer(s) and/or other polarization-dependent component(s), prism(s), and/or anti-reflection element(s) (e.g., coating(s)), that interact with input light before the light is sensed by the sensor 700. The effects of these optical components 802 contribute to a distortion function D, described in more detail below.

The rolling shutter camera 604 can additionally be characterized by an intrinsic function P that can account for geometric properties of the rolling shutter camera 604, such as the optical center of the sensor 700, the focal length of the rolling shutter camera 604, and/or dimensions of the sensor 700.

As shown in FIG. 8, these relationships and parameters can be characterized as a series of transformations. Light from a real-world position (x, y, z) is projected to the $(x_c, y_c)$ plane of a captured image with coordinates (u, v)=(x/z, y/z), according to the ideal pinhole camera model. The coordinates (u, v) are processed with the distortion function D, e.g., to account for distortion such as barrel, pincushion, and/or waveform distortion, to obtain a modified projected position (u', v')=D(u, v). For example, given two projected coordinates $(u_1, v_1)$ and $(u_2, v_2)$ based on a pinhole projection model, and two image coordinates $(x_{c1}, y_{c1})$ and $(x_{c2}, y_{c2})$ (or sensor coordinates corresponding to the image coordinates, as described in reference to FIG. 7) resulting from the projected coordinates, the relative angles and distances between $(u_1, v_1)$ and $(u_2, v_2)$, and between $(x_{c1}, y_{c1})$ and $(x_{c2}, y_{c2})$, may be different from another. Lines that are straight in an imaged environment may not be straight in a captured image. For example, even if $(u_1, v_1)$ and $(u_2, v_2)$ are horizontally aligned (e.g., with $v_1=v_2$), the resulting image coordinates $(x_{c1}, y_{c1})$ and $(x_{c2}, y_{c2})$ may not be horizontally aligned, e.g., because of distortion in a lens of the rolling shutter camera. The distortion function D transforms (u, v) into (u', v'), modified projected position coordinates, to account for this and other types of distortion.

This modified projected position is then processed with the intrinsic function P to map the corrected projected position to pixels/image coordinates, obtaining $(x_c, y_c)=P\cdot(u', v')+c$, where, for example, P can be a 2×2 matrix and c can be a 2×1 vector representing the offset of the center pixel of the $(x_c, y_c)$ plane of the sensor 700.

However, as noted above, light from different positions in space are detected at different times due to the rolling shutter. In the non-limiting example of a row-wise rolling shutter, the i-th row of an image sensor senses the light at time $t=\tau i/H$, where $\tau$ is the total readout time of the camera (time for all rows to sense light), where $\tau$ in some embodiments is several tens of ms, e.g., 30 ms; H is the total number of rows; and t=0 is set as the time at which image capture begins. $\tau/H$ is indicative of the shutter speed of the rolling shutter camera, which may be expressed as $H/\tau$ (rows/time). Accordingly, based on the equations provided above, if an object has trajectory $q(t)=(x(t), y(t), z(t))$, light from the object is projected onto an image (sensed) at a time $t^*$ such that $Ht^*/\tau=P_2 \cdot D(x(t^*)/z(t^*), y(t^*)/z(t^*))+c_2$, where $P_2$ and $c_2$ are the second rows of P and c, respectively. $t^*$ is not known a priori.

This equation is non-trivial to solve accurately for $t^*$. D may be a high order polynomial, and the relative motion between the object and the camera, represented by q(t), may be a combination of roto-translation that render the equation transcendental, prohibiting closed-form solutions. An iterative method may be used to solve the equation for $t^*$ computationally, but the processing associated with iterative methods may be computationally expensive. For example, in the case where processing is being performed by a computing system on-board an autonomous or semi-autonomous vehicle (e.g., by perception system 402), computing power may be limited, and it may be difficult to solve the equation accurately by iterative means in a short enough time period to allow for the real-time image analysis associated with safe vehicle navigation.

Although the provided equation describes row-wise rolling shutters, similar equations and principles are applicable to column-wise rolling shutters and other types of rolling shutters.

Some embodiments according to this disclosure include methods for, given a first position in an environment, determining a second position in an image that corresponds to the position in the environment. These methods apply one or more approximations that render rolling shutter-related equations, such as the one above, much more easily soluble (e.g., in a closed form), while retaining high accuracy in determination of the second position.

Figure 9:
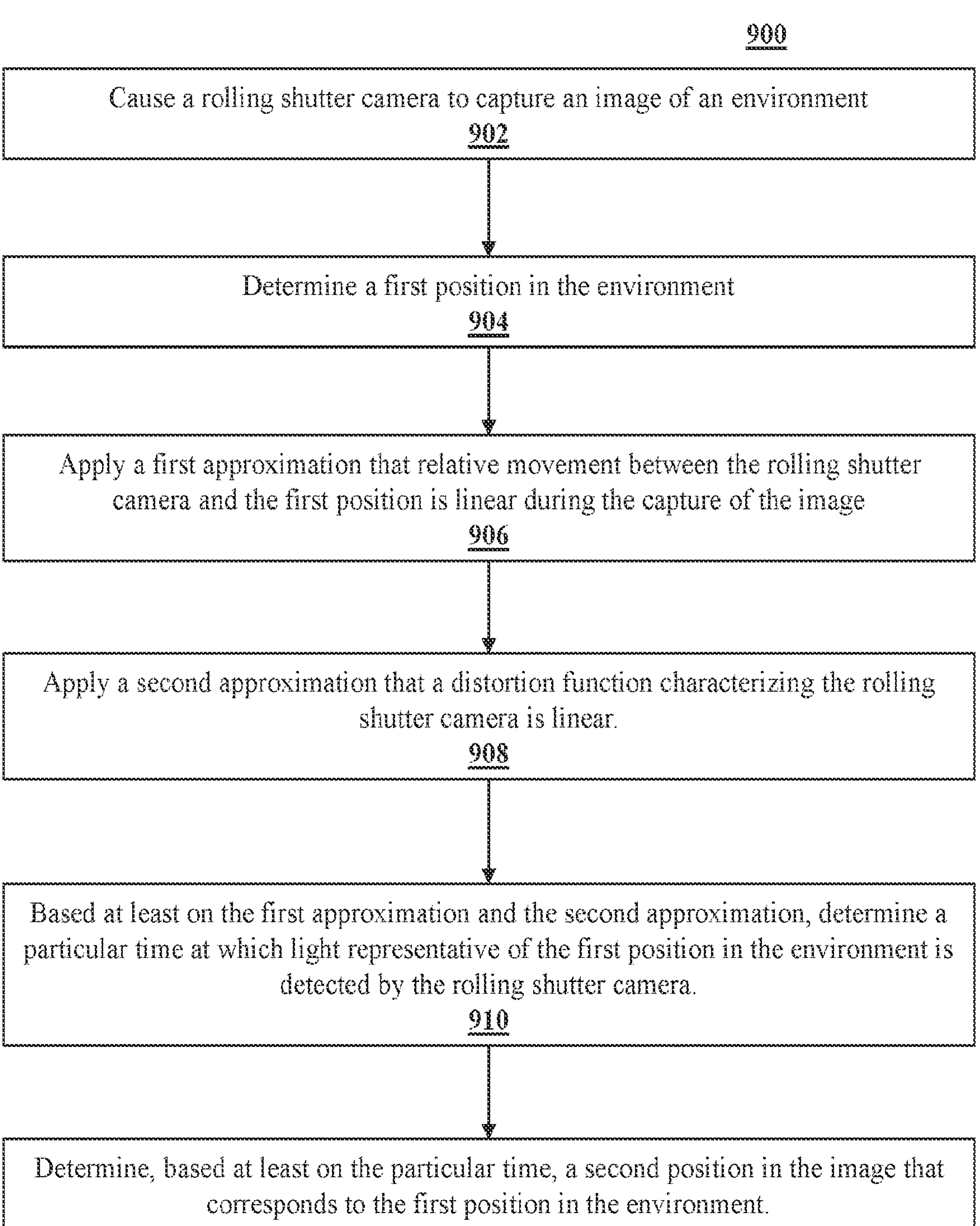
FIG. 9 is a diagram of a process of rolling shutter compensation.

Such methods include the process 900 illustrated in FIG. 9. The process 900 can be performed, for example, by any computing device/system, including but not limited to computing systems described herein, such as remote AV system 114, vehicle-to-infrastructure system 118, fleet management system 116, autonomous system 202, and/or autonomous vehicle compute **202*f*/400 or one or more elements thereof, such as perception system 402. The process 900 can be performed in conjunction with a roller shutter camera, such as an infrastructure-integrated rolling shutter camera (e.g., a vehicle-to-infrastructure device 110 camera configured to capture images of vehicles and/or a vehicular environment) or a vehicle-integrated rolling shutter camera configured to be mounted in a vehicle to capture images of an environment of the vehicle (e.g., cameras 202*a***).

As shown in FIG. 9, the process 900 includes causing a rolling shutter camera to capture an image of an environment (902). For example, autonomous vehicle compute **202*f*/400 can provide one or more electronic signals to a camera 202*a* (in this example, a rolling shutter camera) to cause the camera 202*a* to capture an image of an environment of a vehicle 200. Data representative of the image can be obtained (e.g., in a digital form), e.g., at the perception system 402 of the autonomous vehicle compute 400. Causing the rolling shutter camera to capture the image may be in response to one or more triggers (e.g., detection of an object at the first position, as described in reference to element 904**) and/or may be a continuous, periodic, or otherwise passive process, e.g., a camera mounted in a vehicle may continuously capture images of the environment of the vehicle.

The process 900 further includes determining a first position in the environment (904). The first position is a real-world position, e.g., in a coordinate system such as an absolute coordinate system (e.g., Global Navigation Satellite System (GNSS) coordinates, such as GPS coordinates) or a relative coordinate system (e.g., a coordinate system that moves with the vehicle, such as a coordinate system having an origin located at the vehicle). The first position can be a three-dimensional position having (x, y, z) coordinates as described in reference to FIGS. 5A-5C, 6, and 8.

In some embodiments, the first position is determined based on sensor data. For example, as described in reference to FIG. 5A, another sensor of a vehicle in which the rolling shutter camera is mounted (e.g., a LiDAR sensor **202*b* and/or a radar sensor 202*c***) can detect the presence of an object at the first position, without providing all characteristics of the object. For example, the other sensor may identify the presence of a road sign at the first position, without providing information on the visual content presented by the road sign.

In some embodiments, the first position is a time-dependent first position having coordinates $q(t)=(x(t), y(t), z(t))$ as a function of time. For example, the first position can be a position of an object, and the object may move with respect to a vehicle in which the rolling shutter camera is mounted, based on movement of the object, the vehicle, or both. For example, the object may be a vehicle or other mobile road user, such that movement of the object with respect to the rolling shutter camera, even in the absence of movement of the vehicle, is appreciable over the course of image capture using a rolling shutter. As described above, q(t) can be determined (e.g., normalized with respect to the rolling shutter camera) based on movement of the vehicle, sensor data, and/or other data from other sources.

The process 900 further includes determining a second position in the image that corresponds to the first position in the environment. For example, the first position in the environment can be position (x, y, z) of FIGS. 5A-5B, and the second position in the image can be position $(x_c^*, y_c^*)$ in the image 510 of FIG. 5C. For example, in the example in which the first position is a position of a road sign, determination of the second position may be useful so that the road sign can be visually analyzed in a captured image to determine the information presented by the road sign.

The second position "corresponds" to the first position at least in that the second position is the position in the image to which light from the first position is projected in the image capture process. Because positions in an image correspond to pixels of the image sensor that captured the image, the second position may be equivalently interpreted as being a position on the image sensor, e.g., a particular pixel of the image sensor. When the first position is a position of an object, determination of the second position may be loosely summarized as answering the question "where is the object in this captured image?"

To aid in efficient and accurate determination of the second position (e.g., given the transcendental equation provided above), the process 900 includes the application of two approximations that simplify determination of the second position. These approximations are not merely mathematical simplifications but, rather, represent physics-based approximations that are tied to the particular real-world situation of a rolling shutter camera capturing an image in the presence of relative movement between imaged positions and the rolling shutter camera.

The first applied approximation is an approximation that relative movement between the rolling shutter camera and the first position is linear during capture of the image (906). For example, although, in practice, either or both of the rolling shutter camera and the first position may be rotating and turning with respect to one another (represented by time-varying coordinates q(t) of the first position), the first applied approximation is that the relative motion is linear, e.g., that q(t) can be approximated as $q\sim(t)=q_0+vt$, where $q_0$ is a position (which may be, but need not be, q(0) or q(τ) and v is a constant velocity of the first position over the course of rolling shutter operation to capture the image. It will be understood that the "v" in this expression is different from the "v" in the projected coordinates (u, v).

Figure 10B:
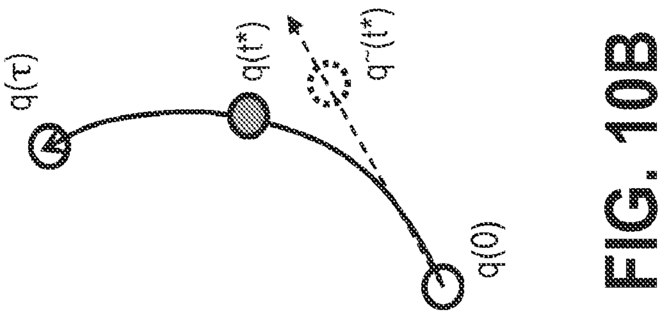
FIGS. 10A-10B are diagrams illustrating trajectory approximation.
Figure 10A:
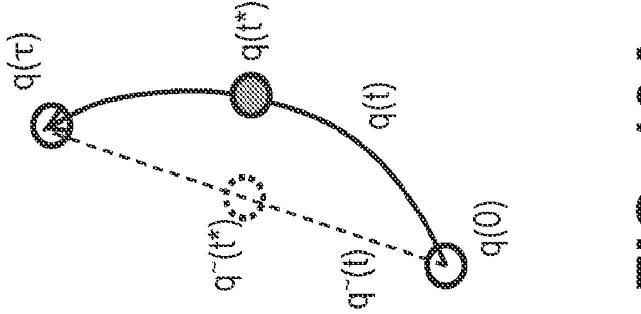

FIGS. 10A-10B illustrate examples of approximations that the relative movement is linear. In the example of FIG. 10A, given a true trajectory q(t), the relative coordinate of the first position at the start of image capture (q(0)) and the relative coordinate of the first position at the end of image capture (q(τ)) are interpolated to obtain an approximate trajectory $q^{\sim}(t)$ with a linearized velocity v=(q(τ)−q(0))/2. At a time t* that corresponds to reception of light from the first position, the first position has true coordinate q(t*); however, according to this approximation, the first position is treated as having the interpolated coordinate $q^{\sim}(t^*)$.

In the example of FIG. 10B, the relative movement is approximated based on extrapolation from an initial relative velocity v=q'(0) of the first position. The approximation assumes that the first position continues movement with that velocity v until completion of image capture.

Other approximations for linear relative movement between the rolling shutter camera and the first position are also within the scope of this disclosure. For example, in some implementations, $q_0$ and/or v are determined by minimizing an error, e.g., an L1, L2, or L-infinity loss function, between the approximate $q^{\sim}(t)$ trajectory (having a constant velocity) and the true trajectory q(t). The $q_0$ and/or v that provide the lowest error between $q^{\sim}(t)$ and q(t), and/or that satisfy one or more other conditions of an optimization process, are selected as defining the approximated constant-velocity $q^{\sim}(t)$.

Applying the first approximation (906) can include determining the linear relative movement, e.g., determining $q_0$ and/or v in the approximate expression $q^{\sim}(t)=q_0+vt$. The linear relative movement can be determined based on one or more of the movement of the rolling shutter camera (or vehicle in which the rolling shutter camera is mounted) m(t), vehicular sensor data (e.g., data from one or more vehicular sensors, such as LiDAR sensors 202*b* and/or radar sensors 202*c*), and/or sensor data from sensor(s) external to the vehicle (e.g., from vehicle-to-infrastructure device 110). For example, a LiDAR sensor 202*b* can provide, to the perception system 402, time-dependent coordinates of the first position with respect to the rolling shutter camera.

The first approximation (906) may neglect higher-order motion dynamics of the rolling shutter camera, an object corresponding to the first position, or both. For example, if a vehicle in which the rolling shutter camera is mounted is performing a sharp turn or another movement associated with a significantly non-constant relative velocity between the rolling shutter camera and the first position, those dynamics may not be accounted for by the first approximation. However, in most real-world conditions, the first approximation provides a sufficiently accurate model of movement during image capture. Accordingly, the first approximation represents not merely a mathematical manipulation but a recognition of physical characteristics associated with typical object and vehicle movement over the timescales associated with rolling shutter camera image capture.

The second applied approximation is an approximation that the distortion function D, which characterizes optical distortion and/or other optical effects of the rolling shutter camera, is linear (908). As described above in reference to FIG. 8, the distortion function D is a function of projected coordinates (u, v) and accounts for effects that may cause spatial distortion between the projected coordinates and image sensor coordinates ($x_c$, $y_c$). In general, D may be nonlinear and may vary significantly across the entire (u, v) space. For example, D may include terms that are quadratic, quartic, and/or sextic functions of u and/or v. The second approximation sets D to be a linear function $D^{\sim}=G\cdot(u, v)+d$, where G is linear in both u and v (e.g., a 2×2 matrix in which each term is linear in both u and v) and d is a constant (e.g., a 2×1 vector). "Linear in both u and v" means that any term of u or v is linear; some or all terms may depend on only u, only v, or neither.

In some implementations, applying the second approximation includes determining the linear $D^{\sim}$. For example, $D^{\sim}$ can be determined using an optimization process, e.g., an optimization process to minimize a loss function, such as an L1, L2, or L-infinity loss function, between $D^{\sim}$ and D. The optimization process can be an optimization process over a universal (u, v) domain (e.g., the entire domain of u and v that correspond to the entire domain of $xc$ and $y_c$), or, in some embodiments, a non-universal domain is determined. If the domain is determined in an effective manner, the accuracy of the second approximation may be improved, because $D^{\sim}$ may be more similar to D in the domain than if a universal domain were used, even if $D^{\sim}$ may be less similar to D outside the domain.

Figure 11:
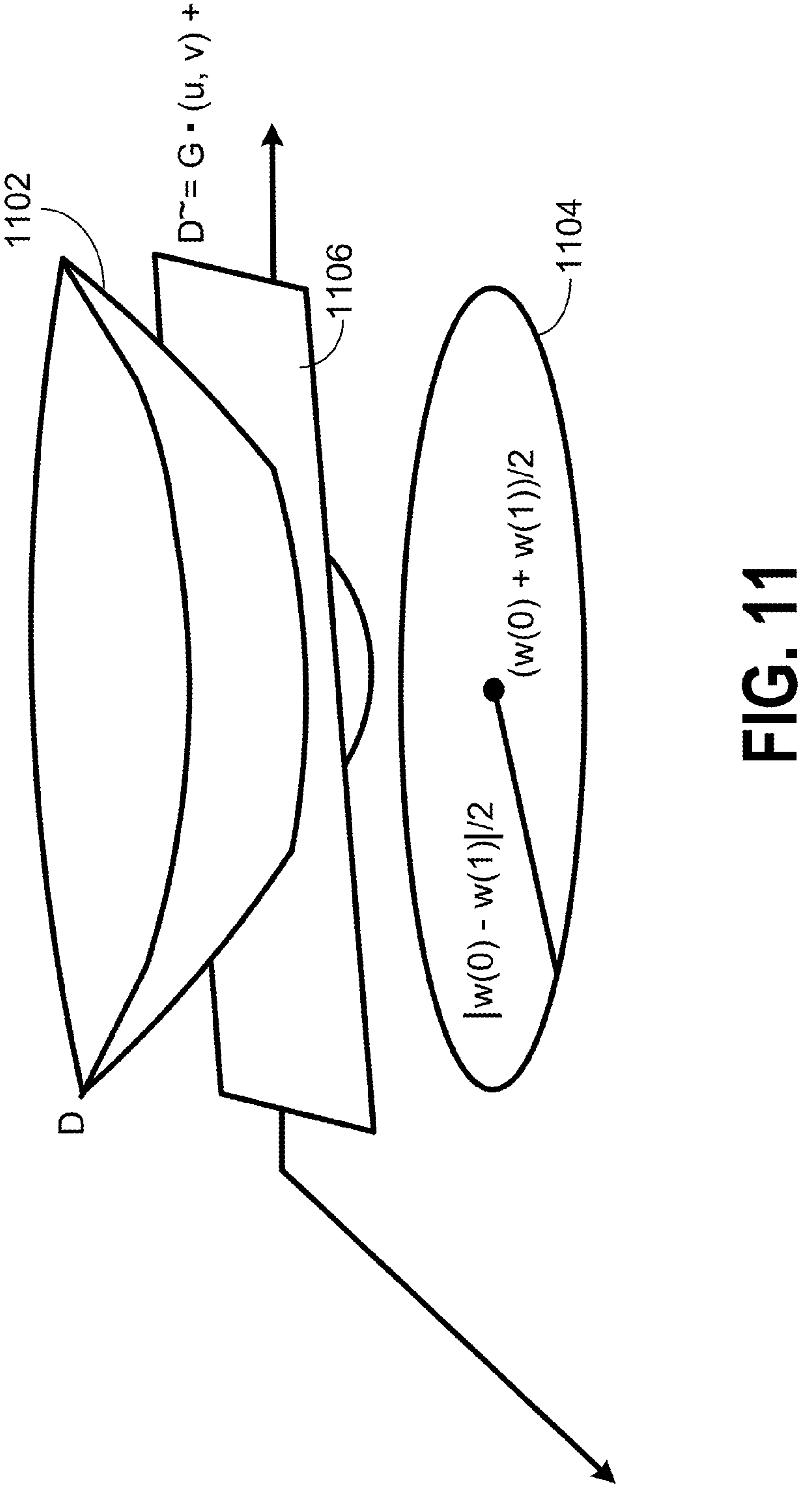
FIG. 11 is a diagram illustrating distortion approximation.

In some embodiments, a domain based on which $D^{\sim}$ is determined (e.g., a domain over which an error function between D and $D^{\sim}$ is minimized to determine $D^{\sim}$) can be based on the input(s) $D/D^{\sim}$ will receive for determination of the second position that corresponds to the first position. For example, the domain can be determined based on u(t) and v(t) for the first position. FIG. 11 illustrates an example of domain determination for determination of $D^{\sim}$. In the illustrated (u, v) space, D 1102 (illustrated only over a domain 1104) is a non-linear function having, in this example, a generally paraboloid shape. The paraboloid shape of D 1102 in some embodiments can reflect increasing distortion for (u, v) coordinates near edges of the (u, v), space, which may be due to worsening lens performance for light incident on edges of a lens. However, various other shapes for D 1102 are also within the scope of this disclosure.

In the example of FIG. 11, the domain 1104 is determined based on w(0)=(u(0), v(0)) and w(1)=(u(τ), v(τ)), where, as described above, u(t)=x(t)/z(t) and v(t)=y(t)/z(t) for the first position. The domain 1104 is determined as a circle centered at (w(0)+w(1))/2 having radius |w(0)−w(1)|/2. This region generally represents the region to which w(t) may be expected to be limited, assuming the relative movement of the first position, q(t), is reasonably regular during image capture (from time t=0 to time t=τ). The domain 1104 in an example of a balance between a too-small domain (over which D 1102 may be unrepresentative of D 1102 in other relevant portions of the (u, v) space) and a too-large domain (over which the approximation of D 1102 provided by $D^{\sim}$ may be poorer). However, other domain selections are also within the scope of this disclosure and may provide effective second approximations. For example, the domain need not be circular but may have other shapes, e.g., shapes based on one or more points of w(t). The domain may be smaller or larger than the domain 1104.

Based on the determination of the domain 1104, $\tilde{D}$ 1106 is determined (e.g., G and/or d are determined) by optimizing $\tilde{D}$1106 over the domain 1104, e.g., minimizing a sum of squared differences between $\tilde{D}$ 1106 and D 1102 over the domain 1104 or minimizing the greatest error between $\tilde{D}$ 1106 and D 1102 over the domain 1104. As shown in FIG. 11, $\tilde{D}$ 1106 is planar, reflecting $\tilde{D}$ 's 1106 linearity in u and v. The approximation provided by $\tilde{D}$ need not be (but may be) an approximation that distortion is uniform; rather, it can be an approximation that $\tilde{D}$ is linearly varying in u and v.

In some cases, the second approximation neglects higher-order distortion effects. For example, if D tends to be flat for (u, v) near a center portion of the (u, v) space and curved at edges of the (u, v) space (e.g., based on better lens performance at the lens's center than at the lens's edges), the linearization of D may model edge positions less well than center positions. However, given most real-world optical devices' distortion functions, the second approximation provides a sufficiently accurate model of distortion in portions of the projected (u, v) space that are relevant to capture of an image. Accordingly, the second approximation represents not merely a mathematical manipulation but a recognition of physical characteristics associated with typical optical distortion over the timescales associated with rolling shutter camera image capture.

In some embodiments, domain determination for the second approximation (908) is adapted to account for edges of the (u, v) space, which correspond to edges of the image captured by the rolling shutter camera. That is, there may exist maximum and/or minimum values of u and/or v beyond which corresponding real-world positions q are not captured in an image. In some embodiments, if a domain would clip outside this bounded (u, v) space, the domain can be determined as the portion of the domain within the bounded (u, v) space. For example, if the circle of domain 1104 illustrated in FIG. 11 would extend beyond a maximum u value $u_{max}$ that corresponds to the image edge, the domain 1104 can be restricted to only those portions of the circle that have $u \le u_{max}$.

Referring again to FIG. 9, the process 900 includes, based on the first approximation and the second approximation, determining a particular time at which light representative of the first position in the environment is detected by the rolling shutter camera (910), e.g., a particular time at which the rolling shutter of the rolling shutter camera causes a pixel of the rolling shutter camera to sense light from the first position in the environment. As described above, for a row-wise rolling shutter, the particular time is t* in the equation $Ht^*/\tau = P_2 \cdot D(x(t^*)/z(t^*),\ y(t^*)/z(t^*)) + c_2$, which is computationally expensive to solve. However, based on the first approximation and the second approximation, this equation reduces to $H\tilde{t}/\tau = P_2 \cdot G \cdot (x_0 + v_x\tilde{t},\ y_0 + v_y t)/(z_0 + v_z\tilde{t}) + P_2 \cdot d + c_2$, where $v_x$, $v_y$, and $v_z$ are the x, y, and z components, respectively, of the constant velocity v of the first position assumed for the first approximation (906). $\tilde{t}$ is an estimate of t* obtained by applying the first and second approximations.

This equation can be expressed as $(z_0 + v_z\tilde{t})(H\tilde{t}/\tau) = P_2 \cdot G \cdot (x_0 + v_x\tilde{t},\ y_0 + v_y t) + (P_2 \cdot d + c_2)(z_0 + v_z\tilde{t})$, which has the quadratic form $k_1\tilde{t}^2 + k_2\tilde{t} + k_3 = 0$, where $k_1 = Hv_z\tau$, $k_2 = Hz_0/\tau - (P \cdot G)_{2,1}v_x - (P \cdot G)_{2,2}v_y - (P_2 \cdot d + c_2)v_z$, and $k_3 = (P \cdot G)_{2,1}x_0 - (P \cdot G)_{2,2}y_0 - (P_2 \cdot d + c_2)z_0$. Accordingly, the equation permits a closed-form solution for $\tilde{t}$, based on the standard closed-form solution for a quadratic equation.

$\tilde{t}$ is an approximate particular time at which light representative of the first position is detected by the rolling shutter camera. The method 900 includes, based on the particular time $\tilde{t}$, determining the second position, in the captured image, that corresponds to the first position (912). For example, $\tilde{t}$ can be provided into an equation mapping real-world coordinates to image coordinates as described in reference to FIG. 8, e.g., $(\tilde{x}_c, \tilde{y}_c) = P \cdot D(x(\tilde{t})/z(\tilde{t}),\ y(\tilde{t})/z(\tilde{t})) + c$, where $(\tilde{x}_c, \tilde{y}_c)$ is the determined second position. In some embodiments, as in this example, neither the first nor the second approximation is applied to determining the second position based on the determined particular time. In some embodiments, one or both of the first approximation or the second approximation can be applied. For example, in some embodiments, the full distortion function D can be used (as opposed to the approximate, linear G) in conjunction with the linearized motion associated with the first approximation, to obtain $(\tilde{x}_c, \tilde{y}_c) = P \cdot D((x_0 + v_x\tilde{t})/(z_0 + \tilde{v}_z),\ (y_0 + v_y\tilde{t})/(z_0 + v_z\tilde{t})) + c$, as described in reference to FIGS. 10A-10B. Other formulas for determining $(\tilde{x}_c, \tilde{y}_c)$ based on the determined particular time to (e.g., $\tilde{t}$ as determined by applying the first and second approximations) are also within the scope of this disclosure.

Tests have shown that process 900, and other processes described herein for determining an image coordinate that corresponds to a real-world coordinate, provide both highly accurate solutions and computationally efficient processing. For example, for a given computing system determining the image coordinate, tests have shown that latency is less than doubled when applying the first and second approximations, compared to methods that do not take into account the relative motion between the first position and the rolling shutter camera. This relatively small increased latency is acceptable and compatible with real-time image processing and analysis. Tests have further shown that the error in image coordinate determination using the described methods is small, e.g., less than 0.1 pixels, on average. Accordingly, accuracy is not substantially compromised to achieve the improved computational efficiency.

In some embodiments, $(\tilde{x}_c, \tilde{y}_c)$ are discretized (or mapped to discretized coordinates) to correspond to a particular pixel of the sensor 700.

Figure 12:
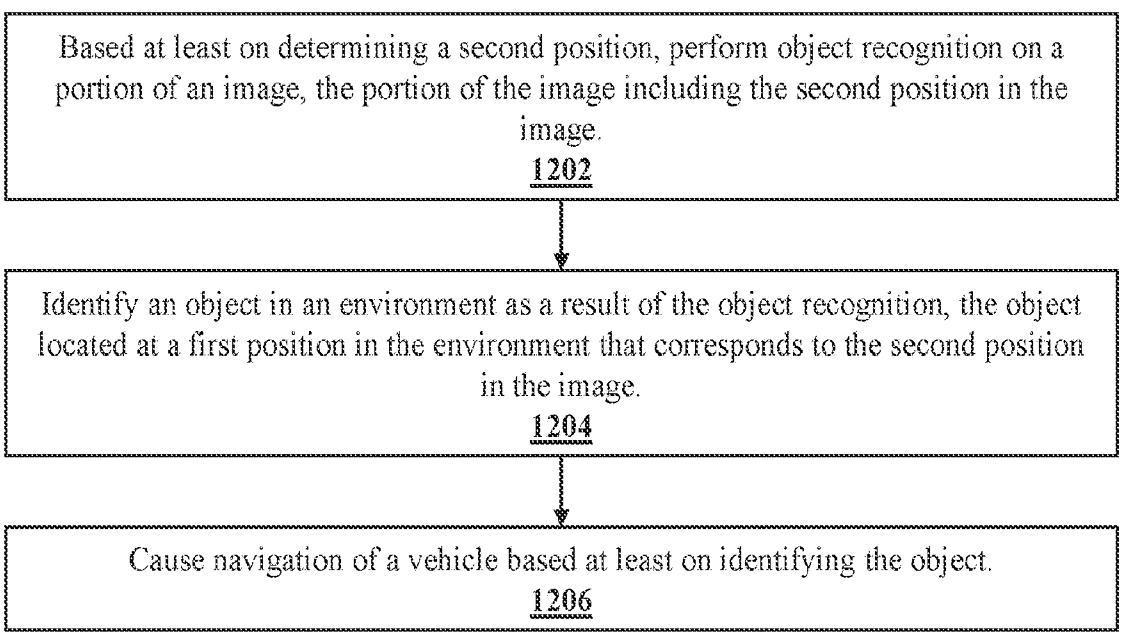
FIG. 12 is a diagram of a process of vehicle navigation.

Once determined, the second position $(\tilde{x}_c, \tilde{y}_c)$ can be used for image analysis, e.g., to guide vehicle navigation. FIG. 12 illustrates a process 1200 that can be performed. for example, by any computing device/system, including but not limited to computing systems described herein, such as remote AV system 114, vehicle-to-infrastructure system 118, fleet management system 116, autonomous system 202, and/or autonomous vehicle compute **202*f*/400 or one or more elements thereof, such as perception system 402, planning system 404, and/or control system 408. The process 1200 can be performed in conjunction with a rolling shutter camera mounted in a vehicle such as vehicles 102, 200, and/or 502, e.g., as described in reference to process 900. In some embodiments, the process 1200 is performed after the process 900 or another process that includes determination of a second position in an image. Accordingly, features described in reference to process 1200 can be the features described in reference to process 900**.

The process 1200 includes, based at least on determining a second position in an image, performing object recognition (which can include image classification) on a portion of the image, the portion of the image including the second position (1202). For example, a pixel located at the second position can form a portion of an object in the image, and object recognition can be performed on the object. For example, as described in reference to FIG. 5C, the position 518 can be the second position, and the person 516 at which the position 518 is located can be analyzed by one or more object recognition processes. Performing object recognition can include, for example, one or more machine vision and/or machine learning methods, such as a convolution neural network (CNN) (e.g., an R-CNN method), a "you only look once" (YOLO) method, and/or any other suitable object recognition/image classification method.

The process 1200 includes identifying an object in an environment as a result of the object recognition, the object located at the first position in the environment (1204). The object can be portrayed in the capture image, and the environment can be an environment that was captured to produce the image. For example, as described in reference to FIG. 5C, the object can be a person 516. Identifying the object, in various embodiments, can including identifying a type of the object (e.g., a person, a road sign, or a wall) and/or identifying a state of the object (e.g., whether a traffic light is projected red, yellow or green signals, whether a person is standing still or walking, what text is on a road sign, etc.).

The process 1200 includes causing navigation of a vehicle based on identifying the object (1206). The vehicle can be a vehicle in which a rolling shutter camera that captured the image is mounted. For example, if the object is identified as an obstacle, the vehicle can be navigated to stop or to avoid the obstacle. As another example, if the object is identified as a road sign or traffic light indicating that the vehicle may proceed, the vehicle can be navigated to continue navigation along the vehicle's route. As another example, if the object as a person in proximity to a roadway, the vehicle can be navigated with decreased speed, to avoid harming the identified person. In various embodiments, causing navigation of the vehicle can include causing a change in speed of the vehicle, causing a change in direction of the vehicle, presenting a notification associated with the identified object (e.g., a notification warning of the identified object), sending a message associated with the identified object (e.g., a vehicle-to-vehicle or vehicle-to-infrastructure message indicating the presence of the identified object), and/or any other control operation described above in reference to control system 408 or other elements of vehicles 102, 200.

In some, non-limiting embodiments, elements 1202 and 1204 of process 1200 are performed by perception system 402. The planning system 404 can generate data associated with at least one route in response to identification of the object. The control system 408 can obtain the at least one route and cause navigation of the vehicle along the at least one route. Because of the computational speedup provided by process 900 and other embodiments of the present disclosure, this can be performed in real-time or near-real time, e.g., processing hundreds of thousands of points (determining hundreds of thousands of second positions corresponding to hundreds of thousands of first positions) in several ms or less.

The systems and processes described above can be applied to various embodiments. In some embodiments, the rolling shutter camera is a wide field of view (WFOV) camera. To adapt the process 900 to a WFOV camera, D is selected to accurately describe the optics of the WFOV camera, and the linearized G is based on the selected D. In addition, as noted above, although some of the foregoing equations relate to row-wise rolling shutter embodiments, the same processes can be applied to column-wise rolling shutter embodiments, e.g., by using a width W in place of a height H of the sensor of the rolling shutter camera, by using $c_1$ in place of $c_2$, and by using $P_1$ in place of $P_2$. In addition, although some of the foregoing equations relate to top-down rolling shutter embodiments, the same processes can be applied to bottom-up embodiments (or, e.g., right-left instead of left-right). For example, t can be replaced with (1-t) to change the direction of the rolling shutter to which the equations apply.

In some embodiments, the described processes can include piece-wise approximations for one or both of the relative motion of the first position and the rolling shutter camera (first approximation) or the distortion (the second approximation). D(u, v) and/or q(t) can be divided into multiple parts, each of which is approximated with a linear expression. In such embodiments, $\tilde{t}$ can be determined by performing a search (e.g., a binary search) over the multiple linearized parts, e.g., in an iterative fashion. These piecewise embodiments can provide improved accuracy (by improving the accuracy of the first and/or second approximations), in some cases with the cost of increased processing time/resources consumed.

Moreover, in some embodiments, the approximations described herein facilitate parallel image processing, e.g., simultaneous determination of multiple positions in the image that correspond to multiple real world positions.

According to some non-limiting embodiments or examples, provided is a method comprising: causing, by at least one processor, a rolling shutter camera to capture an image of an environment; determining, by the at least one processor, a first position in the environment, the first position captured in the image; and determining, by the at least one processor, a second position in the image that corresponds to the first position in the environment, wherein determining the second position comprises: applying a first approximation that relative movement between the rolling shutter camera and the first position is linear during the capture of the image, applying a second approximation that a distortion function characterizing the rolling shutter camera is linear, and based at least on the first approximation and the second approximation, determining a particular time at which light representative of the first position in the environment is detected by the rolling shutter camera, wherein determining the second position is based at least on the particular time.

According to some non-limiting embodiments or examples, provided is a system, comprising: a rolling shutter camera configured to be mounted in a vehicle; at least one processor; and at least one memory storing instructions thereon that, when executed by the at least one processor, cause the at least one processor to: cause the rolling shutter camera to capture an image of an environment of the vehicle; determine a first position in the environment, the first position captured in the image; and determine a second position in the image that corresponds to the first position in the environment, wherein determining the second position comprises: applying a first approximation that relative movement between the rolling shutter camera and the first position is linear during capture of the image, wherein the relative movement between the rolling shutter camera and the first position is based at least on relative movement between the vehicle and the first position, applying a second approximation that a distortion function characterizing the rolling shutter camera is linear, and based at least on the first approximation and the second approximation, determining a particular time at which light representative of the first position in the environment is detected by the rolling shutter camera, wherein determining the second position is based at least on the particular time.

According to some non-limiting embodiments or examples, provided is a non-transitory computer-readable medium comprising instructions stored thereon that, when executed by at least one processor, cause the at least one processor to carry out operations comprising: causing a rolling shutter camera to capture an image of an environment; determining a first position in the environment, the first position captured in the image; and determining a second position in the image that corresponds to the first position in the environment, wherein determining the second position comprises: applying a first approximation that relative movement between the rolling shutter camera and the first position is linear during the capture of the image, applying a second approximation that a distortion function characterizing the rolling shutter camera is linear, and based at least on the first approximation and the second approximation, determining a particular time at which light representative of the first position in the environment is detected by the rolling shutter camera, and wherein determining the second position is based at least on the particular time.

Further non-limiting aspects or embodiments are set forth in the following numbered clauses:

Clause 1: A method comprising: causing, by at least one processor, a rolling shutter camera to capture an image of an environment; determining, by the at least one processor, a first position in the environment, the first position captured in the image; and determining, by the at least one processor, a second position in the image that corresponds to the first position in the environment, wherein determining the second position comprises: applying a first approximation that relative movement between the rolling shutter camera and the first position is linear during the capture of the image, applying a second approximation that a distortion function characterizing the rolling shutter camera is linear, and based at least on the first approximation and the second approximation, determining a particular time at which light representative of the first position in the environment is detected by the rolling shutter camera, wherein determining the second position is based at least on the particular time.

Clause 2: The method of any of the preceding clauses, wherein the rolling shutter camera is mounted in a vehicle, and wherein determining the second position comprises: determining movement of the vehicle during the capture of the image; and determining the relative movement between the rolling shutter camera and the first position based at least on the movement of the vehicle.

Clause 3: The method of any of the preceding clauses, wherein the rolling shutter camera comprises a rolling shutter that causes successive pixels of the rolling shutter camera to detect light for the capture of the image, and wherein determining the second position comprises determining a pixel of the rolling shutter camera that detects the light representative of the first position.

Clause 4: The method of any of the preceding clauses, wherein, based at least on operation of the rolling shutter, a first group of pixels arranged in a first row of the rolling shutter camera detects light at a different time than a second ground of pixels arranged in a second row of the rolling shutter camera.

Clause 5: The method of any of the preceding clauses, wherein the particular time is determined based at least on one or more of a shutter speed of a rolling shutter of the rolling shutter camera, a projection function of the rolling shutter camera, the distortion function, or the relative movement between the rolling shutter camera and the first position.

Clause 6: The method of any of the preceding clauses, wherein the first approximation comprises a linear interpolation between (i) relative positions of the rolling shutter camera and the first position at a first time and (ii) relative positions of the rolling shutter camera and the first position at a second time.

Clause 7: The method of any of the preceding clauses, wherein the second approximation comprises a planar expression for distortion as a function of two projected coordinates.

Clause 8: The method of any of the preceding clauses, wherein the rolling shutter camera is mounted in a vehicle, and wherein the method comprises: based at least on determining the second position, performing object recognition, by the at least one processor, on a portion of the image, the portion of the image including the second position in the image; identifying, by the at least one processor, an object in the environment as a result of the object recognition, the object located at the first position in the environment; and causing, by the at least one processor, navigation of the vehicle based at least on identifying the object.

Clause 9: The method of any of the preceding clauses, wherein the distortion function characterizes effects of a lens of the rolling shutter camera.

Clause 10: The method of any of the preceding clauses, comprising determining the second position in parallel with determining a plurality of third positions in the image, the third positions corresponding to respective second positions in the environment, wherein the parallel determination is free of branching.

Clause 11: The method of any of the preceding clauses, wherein determining the second position comprises: based at least on the first approximation and the second approximation, obtaining a closed-form expression for the particular time, and determining the particular time using the closed-form expression.

Clause 12: A system, comprising: a rolling shutter camera configured to be mounted in a vehicle; at least one processor; and at least one memory storing instructions thereon that, when executed by the at least one processor, cause the at least one processor to: cause the rolling shutter camera to capture an image of an environment of the vehicle; determine a first position in the environment, the first position captured in the image; and determine a second position in the image that corresponds to the first position in the environment, wherein determining the second position comprises: applying a first approximation that relative movement between the rolling shutter camera and the first position is linear during capture of the image, wherein the relative movement between the rolling shutter camera and the first position is based at least on relative movement between the vehicle and the first position, applying a second approximation that a distortion function characterizing the rolling shutter camera is linear, and based at least on the first approximation and the second approximation, determining a particular time at which light representative of the first position in the environment is detected by the rolling shutter camera, wherein determining the second position is based at least on the particular time.

Clause 13: The system of any of the preceding clauses, wherein the rolling shutter camera comprises a rolling shutter that causes successive pixels of the rolling shutter camera to detect light for the capture of the image, and wherein determining the second position comprises determining a pixel of the rolling shutter camera that detects the light representative of the first position.

Clause 14: The system of any of the preceding clauses, wherein the particular time is determined based at least on one or more of a shutter speed of a rolling shutter of the rolling shutter camera, a projection function of the rolling shutter camera, the distortion function, or the relative movement between the rolling shutter camera and the first position.

Clause 15: The system of any of the preceding clauses, wherein the first approximation comprises a linear interpolation between (i) relative positions of the rolling shutter camera and the first position at a first time and (ii) relative positions of the rolling shutter camera and the first position at a second time.

Clause 16: The system of any of the preceding clauses, wherein the second approximation comprises a planar expression for distortion as a function of two projected coordinates.

Clause 17: The system of any of the preceding clauses, wherein the instructions, when executed by the at least one processor, cause the at least one processor to, based at least on determining the second position, perform object recognition on a portion of the image, the portion of the image including the second position in the image; identify an object in the environment as a result of the object recognition, the object located at the first position in the environment; and cause navigation of the vehicle based at least on identifying the object.

Clause 18: A non-transitory computer-readable medium comprising instructions stored thereon that, when executed by at least one processor, cause the at least one processor to carry out operations comprising: causing a rolling shutter camera to capture an image of an environment; determining a first position in the environment, the first position captured in the image; and determining a second position in the image that corresponds to the first position in the environment, wherein determining the second position comprises: applying a first approximation that relative movement between the rolling shutter camera and the first position is linear during the capture of the image, applying a second approximation that a distortion function characterizing the rolling shutter camera is linear, and based at least on the first approximation and the second approximation, determining a particular time at which light representative of the first position in the environment is detected by the rolling shutter camera, and wherein determining the second position is based at least on the particular time.

Clause 19: The non-transitory computer-readable medium of any of the preceding clauses, wherein the rolling shutter camera is mounted in a vehicle, and wherein determining the second position comprises: determining movement of the vehicle during capture of the image; and determining the relative movement between the rolling shutter camera and the first position based at least on the movement of the vehicle.

Clause 20: The non-transitory computer-readable medium of any of the preceding clauses, wherein the rolling shutter camera comprises a rolling shutter that causes successive pixels of the rolling shutter camera to detect light for the capture of the image, and wherein determining the second position comprises determining a pixel of the rolling shutter camera that detects the light representative of the first position.

Clause 21: The non-transitory computer-readable medium of any of the preceding clauses, wherein the rolling shutter camera is mounted in a vehicle, and wherein the operations comprise: based at least on determining the second position, performing object recognition on a portion of the image, the portion of the image including the second position in the image; identifying an object in the environment as a result of the object recognition, the object located at the first position in the environment; and causing navigation of the vehicle based at least on identifying the object.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:

causing, by at least one processor, a rolling shutter camera to capture an image of an environment;

determining, by the at least one processor, a first position in the environment, the first position captured in the image; and determining, by the at least one processor, a second position in the image that corresponds to the first position in the environment, wherein determining the second position comprises:

applying a first approximation that relative movement between the rolling shutter camera and the first position is linear during the capture of the image, applying a second approximation that a distortion function characterizing the rolling shutter camera is linear, and based at least on the first approximation and the second approximation, determining a particular time at which light representative of the first position in the environment is detected by the rolling shutter camera, wherein determining the second position is based at least on the particular time.

2. The method of claim 1, wherein the rolling shutter camera is mounted in a vehicle, and wherein determining the second position comprises:

determining movement of the vehicle during the capture of the image; and determining the relative movement between the rolling shutter camera and the first position based at least on the movement of the vehicle.

3. The method of claim 1, wherein the rolling shutter camera comprises a rolling shutter that causes successive pixels of the rolling shutter camera to detect light for the capture of the image, and wherein determining the second position comprises determining a pixel of the rolling shutter camera that detects the light representative of the first position.

4. The method of claim 3, wherein, based at least on operation of the rolling shutter, a first group of pixels arranged in a first row of the rolling shutter camera detects light at a different time than a second ground of pixels arranged in a second row of the rolling shutter camera.

5. The method of claim 1, wherein the particular time is determined based at least on one or more of a shutter speed of a rolling shutter of the rolling shutter camera, a projection function of the rolling shutter camera, the distortion function, or the relative movement between the rolling shutter camera and the first position.

6. The method of claim 1, wherein the first approximation comprises a linear interpolation between (i) relative positions of the rolling shutter camera and the first position at a first time and (ii) relative positions of the rolling shutter camera and the first position at a second time.

7. The method of claim 1, wherein the second approximation comprises a planar expression for distortion as a function of two projected coordinates.

8. The method of claim 1, wherein the rolling shutter camera is mounted in a vehicle, and wherein the method comprises:

based at least on determining the second position, performing object recognition, by the at least one processor, on a portion of the image, the portion of the image including the second position in the image;

identifying, by the at least one processor, an object in the environment as a result of the object recognition, the object located at the first position in the environment; and causing, by the at least one processor, navigation of the vehicle based at least on identifying the object.

9. The method of claim 1, wherein the distortion function characterizes effects of a lens of the rolling shutter camera.

10. The method of claim 1, comprising determining the second position in parallel with determining a plurality of third positions in the image, the third positions corresponding to respective second positions in the environment, wherein the parallel determination is free of branching.

11. The method of claim 1, wherein determining the second position comprises:

based at least on the first approximation and the second approximation, obtaining a closed-form expression for the particular time, and determining the particular time using the closed-form expression.

12. A system, comprising:

a rolling shutter camera configured to be mounted in a vehicle;

at least one processor; and at least one memory storing instructions thereon that, when executed by the at least one processor, cause the at least one processor to:

cause the rolling shutter camera to capture an image of an environment of the vehicle;

determine a first position in the environment, the first position captured in the image; and determine a second position in the image that corresponds to the first position in the environment, wherein determining the second position comprises:

applying a first approximation that relative movement between the rolling shutter camera and the first position is linear during capture of the image, wherein the relative movement between the rolling shutter camera and the first position is based at least on relative movement between the vehicle and the first position, applying a second approximation that a distortion function characterizing the rolling shutter camera is linear, and based at least on the first approximation and the second approximation, determining a particular time at which light representative of the first position in the environment is detected by the rolling shutter camera, wherein determining the second position is based at least on the particular time.

13. The system of claim 12, wherein the rolling shutter camera comprises a rolling shutter that causes successive pixels of the rolling shutter camera to detect light for the capture of the image, and wherein determining the second position comprises determining a pixel of the rolling shutter camera that detects the light representative of the first position.

14. The system of claim 12, wherein the particular time is determined based at least on one or more of a shutter speed of a rolling shutter of the rolling shutter camera, a projection function of the rolling shutter camera, the distortion function, or the relative movement between the rolling shutter camera and the first position.

15. The system of claim 12, wherein the first approximation comprises a linear interpolation between (i) relative positions of the rolling shutter camera and the first position at a first time and (ii) relative positions of the rolling shutter camera and the first position at a second time.

16. The system of claim 12, wherein the second approximation comprises a planar expression for distortion as a function of two projected coordinates.

17. The system of claim 12, wherein the instructions, when executed by the at least one processor, cause the at least one processor to, based at least on determining the second position, perform object recognition on a portion of the image, the portion of the image including the second position in the image;

identify an object in the environment as a result of the object recognition, the object located at the first position in the environment; and cause navigation of the vehicle based at least on identifying the object.

18. A non-transitory computer-readable medium comprising instructions stored thereon that, when executed by at least one processor, cause the at least one processor to carry out operations comprising:

causing a rolling shutter camera to capture an image of an environment;

determining a first position in the environment, the first position captured in the image; and determining a second position in the image that corresponds to the first position in the environment, wherein determining the second position comprises:

applying a first approximation that relative movement between the rolling shutter camera and the first position is linear during the capture of the image, applying a second approximation that a distortion function characterizing the rolling shutter camera is linear, and based at least on the first approximation and the second approximation, determining a particular time at which light representative of the first position in the environment is detected by the rolling shutter camera, and wherein determining the second position is based at least on the particular time.

19. The non-transitory computer-readable medium of claim 18, wherein the rolling shutter camera is mounted in a vehicle, and wherein determining the second position comprises:

determining movement of the vehicle during capture of the image; and determining the relative movement between the rolling shutter camera and the first position based at least on the movement of the vehicle.

20. The non-transitory computer-readable medium of claim 18, wherein the rolling shutter camera comprises a rolling shutter that causes successive pixels of the rolling shutter camera to detect light for the capture of the image, and wherein determining the second position comprises determining a pixel of the rolling shutter camera that detects the light representative of the first position.

21. The non-transitory computer-readable medium of claim 18, wherein the rolling shutter camera is mounted in a vehicle, and wherein the operations comprise:

based at least on determining the second position, performing object recognition on a portion of the image, the portion of the image including the second position in the image;

identifying an object in the environment as a result of the object recognition, the object located at the first position in the environment; and causing navigation of the vehicle based at least on identifying the object.

* * * * *